United States Patent [19]

Setan

[11] Patent Number: 4,951,560
[45] Date of Patent: Aug. 28, 1990

[54] DOUBLE DECK RAIL CAR WITH BAGGAGE RACKS

[75] Inventor: Claude Setan, Famars, France

[73] Assignee: Societe Anonyme dite : Compagnie Industrielle de Materiel de Transport C.I.M.T. Lorraine, Courbevoie, France

[21] Appl. No.: 336,494

[22] Filed: Apr. 12, 1989

[30] Foreign Application Priority Data

Apr. 14, 1988 [FR] France .................. 88 04946

[51] Int. Cl.$^5$ .................. B61D 37/00; B60R 11/00
[52] U.S. Cl. .................. 105/340; 105/345; 224/29.5
[58] Field of Search .................. 105/325, 340, 345; 297/192; 224/29.5; 312/245–248; 244/118.6, 120

[56] References Cited

U.S. PATENT DOCUMENTS 2,698,569 1/1955 Reynolds et al. .................. 105/340 X
2,811,932 11/1957 Clary .................. 105/345 X

FOREIGN PATENT DOCUMENTS 8619327 10/1986 Fed. Rep. of Germany .
1086111 2/1955 France .
1473111 2/1967 France .................. 244/118.6
2588173 10/1985 France .
2136683 9/1984 United Kingdom .................. 297/192

OTHER PUBLICATIONS

"Pladoyer fur die Einfuhrung von Doppelstockwagen im Nationalen und Internationalen (RIC)-Verkehr" 198 Zeitschrift fur Eisenbahnwesen Und Verkehstechnik.-Glasers Annalen (1984), Jul./Aug., No. 7/8, Berlin, Deutschland.

Primary Examiner—Robert J. Oberleitner
Attorney, Agent, or Firm—Sughrue, Mion, Zinn, Macpeak & Seas

[57] ABSTRACT

The present invention relates to a double deck rail car having baggage racks (10, 20) for each deck, characterized in that the top deck (1) is lowered beneath the rows of seats on the top deck in order to make sufficient room beneath the ceiling for baggage racks to be installed beneath the ceiling above the top deck, with baggage racks (10) for the bottom deck being integrated in the bases (2) of the seats (50) on the top deck.

7 Claims, 4 Drawing Sheets

4,951,560

DOUBLE DECK RAIL CAR WITH BAGGAGE RACKS

The present invention relates to a double deck rail car.

BACKGROUND OF THE INVENTION

Double deck rail cars are enjoying increasing commercial success by making maximum use of the applicable loading gauge, thereby enabling a maximum number of passengers to be transported at minimum cost.

However, such double deck cars do not have baggage space close to the passengers since the space beneath the ceiling is limited both on the bottom deck and on the top deck.

In commuter type utilization, nearly all passengers have hand luggage only and the problem of storing medium sized baggage hardly ever occurs.

In main line use, however, the problem of housing baggage close to passengers becomes crucial.

The car of the present invention makes it possible to store baggage close to passengers, on both decks.

SUMMARY OF THE INVENTION

The present invention provides a double deck rail car including baggage racks for each deck, wherein the top deck is lowered beneath the rows of seats on the top deck in order to make sufficient room beneath the ceiling to enable baggage racks to be installed beneath the ceiling above the top deck, with baggage racks for the bottom deck being integrated in the bases of the seats on the top deck.

In a first embodiment, applicable to a row of pairs of seats placed side-by-side, the racks are disposed in the longitudinal direction of the car in order to be accessible from in front of the seats.

A second embodiment applicable to a row of single seats, the racks are disposed perpendicularly to the longitudinal direction of the car in order to be accessible from the gangway.

In a variant of this second embodiment, the racks may be disposed in the longitudinal direction of the car in order to be accessible from in front of the seats.

BRIEF DESCRIPTION OF THE DRAWINGS

A car in accordance with the invention is described below by way of example with reference to the accompanying drawings, in which.

DETAILED DESCRIPTION

Figure 1:
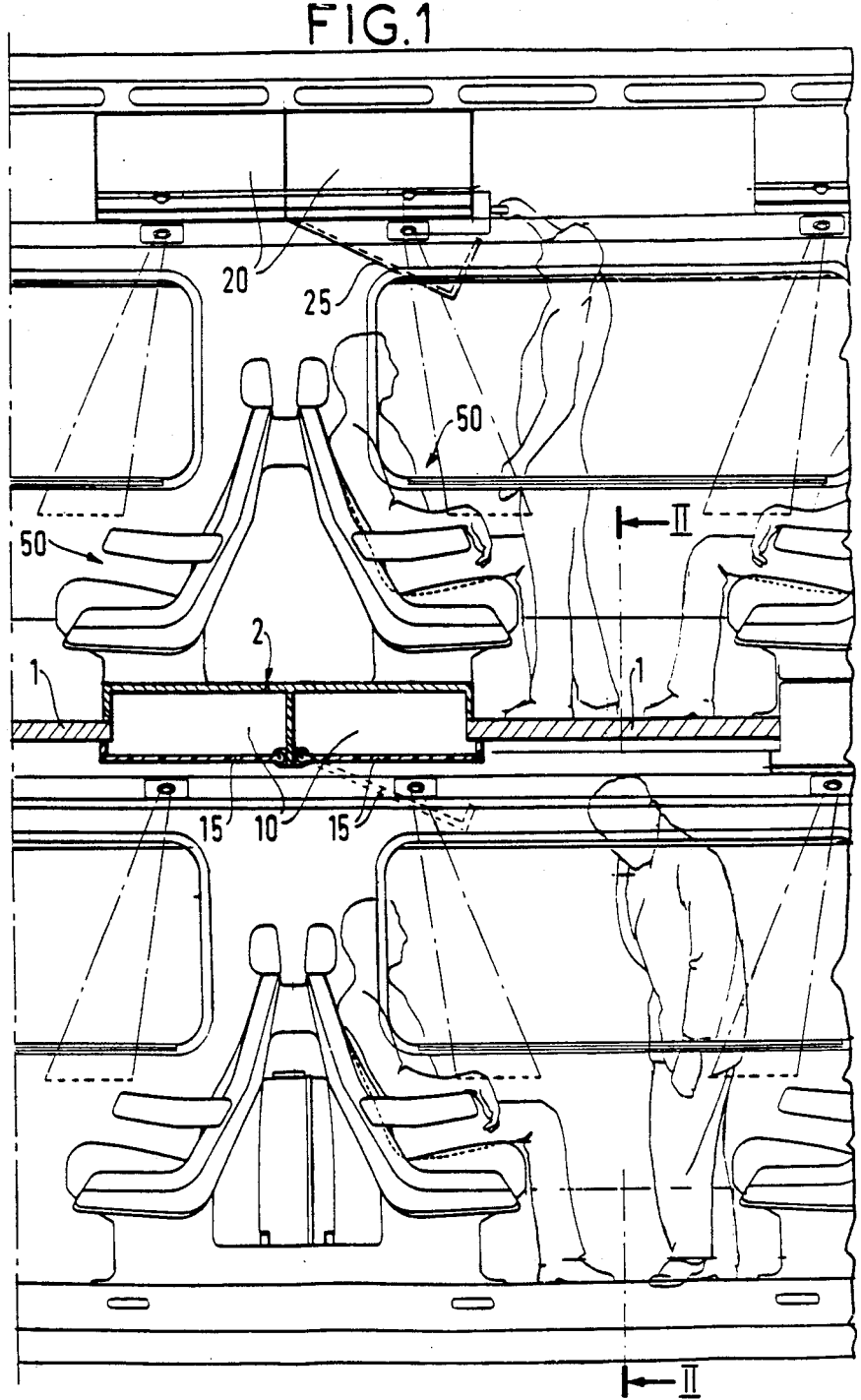
FIG. 1 shows a first embodiment in partial section on I of FIG. 2.
Figure 2:
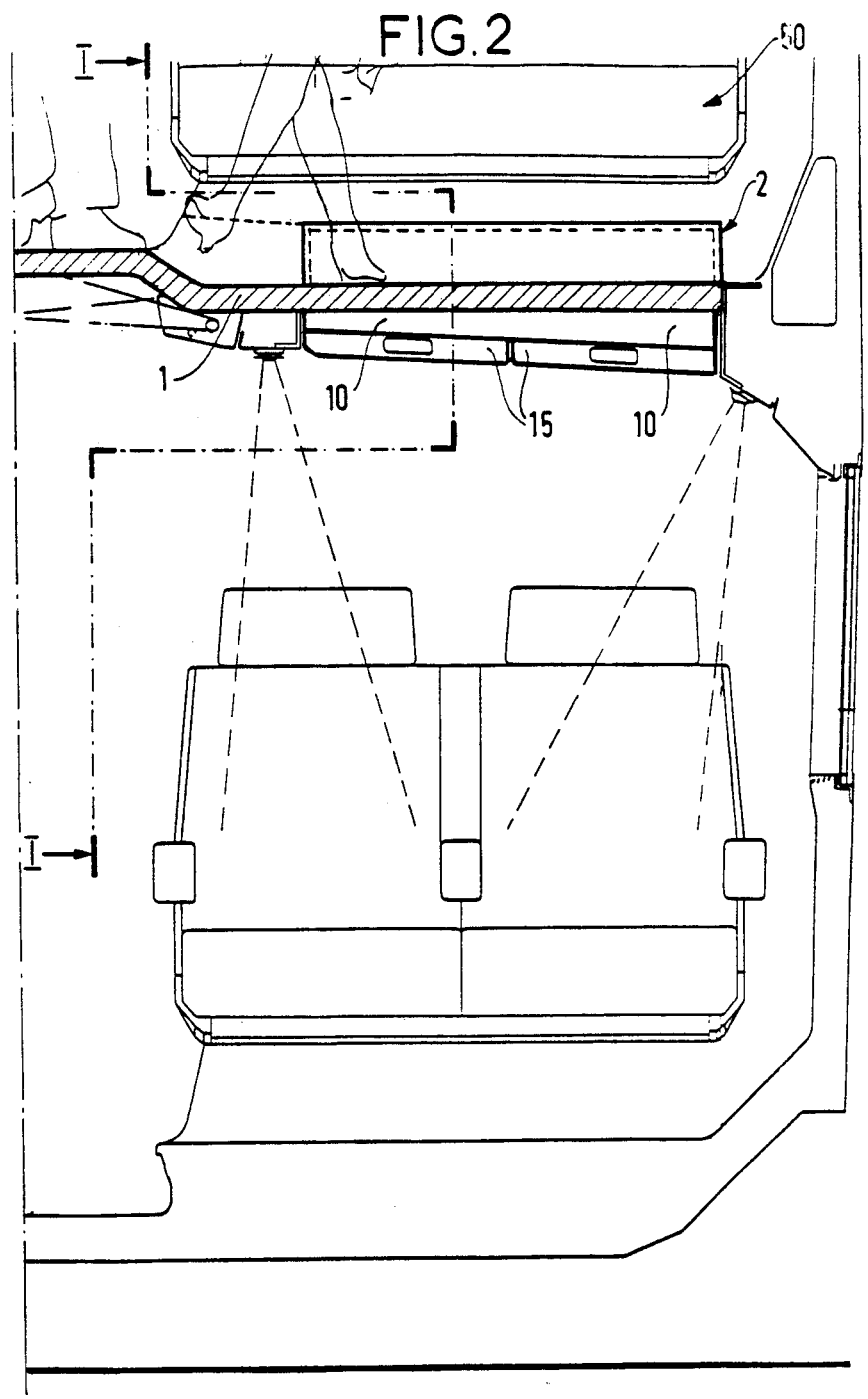
FIG. 2 is a fragmentary view on II of FIG. 1.

In FIG. 1, the top deck 1 between the two levels is lowered by means of dropped, recessed sections beneath its rows of seats 50 separated by a gangway or aisle between the rows of seats, as can be seen in FIG. 2. Lowering the deck in this way makes room for baggage racks 20 in the ceiling above the top deck, but limits the room available beneath the ceiling above the bottom deck. To remedy this, baggage racks 10 for the bottom deck are received in the bases of the seats on the top deck.

The top deck recessed sections therefore have holes to give access to the seat bases.

The bases are long enough to provide room for two racks back-to-back and wide enough to receive two racks side-by-side. One seat base 2 can therefore receive four racks 10. Four racks 20 which are substantially identical to the racks 10 for the bottom deck are likewise installed above the top deck.

Each of the four racks 10 includes a tilting cover 15 which serves as a floor for baggage. The hinge axis of each cover is perpendicular to the longitudinal axis of the car with the covers then opening to be accessible from in front of the seats.

Figure 3:
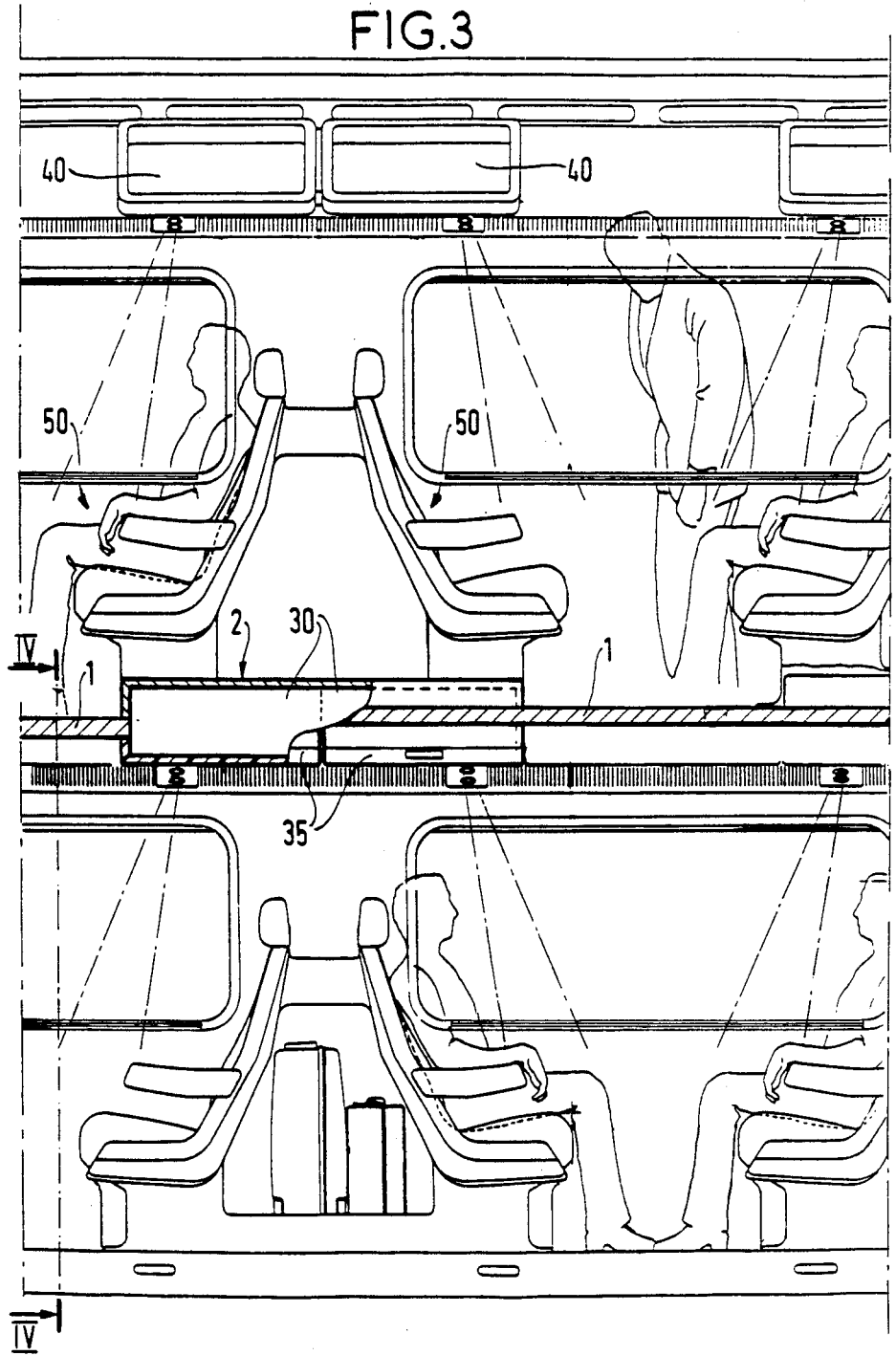
FIG. 3 shows a second embodiment in section on III of FIG. 4, and partially cut away around a rack.
Figure 4:
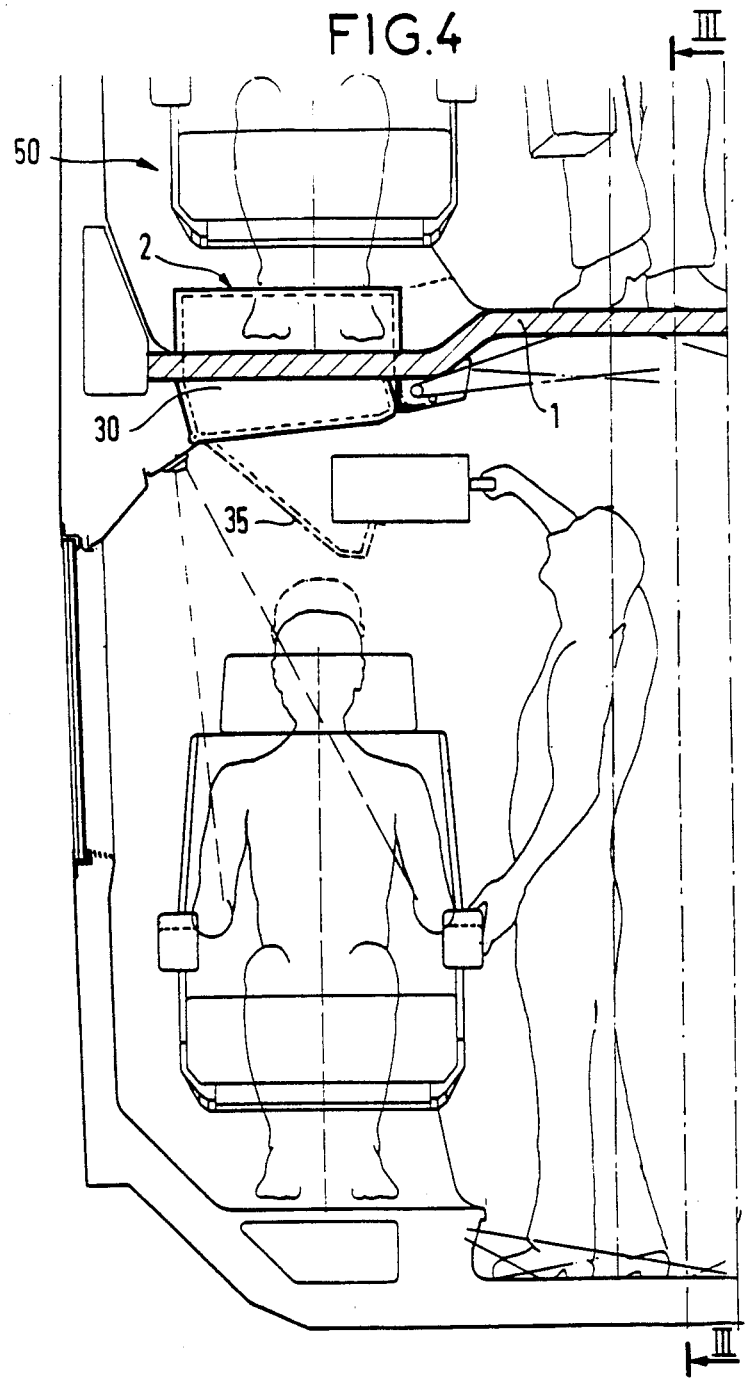
FIG. 4 is a fragmentary view on III of FIG. 3.

In FIG. 3, the racks 30 above the bottom deck are received in the bases 2 of the signal seats 50 on the top deck. The bases are long enough to receive two racks 30 side-by-side, but they can receive only one rack widthwise. A base 2 therefore receives only two racks, and these racks are accessible from the gangway or aisle between the seats, as can be seen in FIG. 4.

The top deck likewise includes pairs of racks 40 which are substantially identical to those of the bottom deck.

Each of the two racks 30 includes a tilting cover 35, and in this case the covers are hinged about an axis parallel to the longitudinal axis of the car.

The pairs of racks 40 do not include tilting covers, but in a variant, this would naturally be possible.

In a variant of this second embodiment, the racks 30 and 40 may be disposed longitudinally like the racks 10 and 20 of the first embodiment.

I claim:

1. A double deck rail car including upper and lower levels, said upper level including a ceiling, a bottom deck for said lower level, a top deck for said upper level forming a ceiling for said lower level, and seats mounted by bases to said decks for said upper and lower levels, the improvement comprising:

dropped, recessed sections of said top deck beneath and to opposite sides of an aisle formed by said top deck between said recessed sections, said seats being provided in rows along said dropped, recessed sections, holes within said recessed sections of said top deck, lower level baggage racks within said holes, having an upper portion protruding from said holes into said upper level and being integrated to the bases of said seats on the top deck recessed sections and having a bottom portion projecting from said holes within the lower level, and upper level baggage racks mounted beneath the ceiling of said upper level whereby by mounting the seats within said dropped, recessed sections of said top deck, sufficient space exists between said ceiling for said upper level and said seats to mount said upper level baggage racks without discomfort to passengers occupying said seats while permitting ready access to said baggage racks of said lower level by passengers within said lower level.

2. A car according to claim 1, wherein the racks for a row of pairs of seats disposed side-by-side are themselves disposed in the longitudinal direction of the car in order to be accessible from in front of the seats.

3. A car according to claim 2, wherein the racks for the bottom deck include tilting covers opening downwardly into said lower level.

4. A car according to claim 1, wherein the racks for a row of single seats are disposed perpendicularly to the longitudinal direction of the car and are accessible from the aisle.

5. A car according to claim 4, wherein the racks for the bottom deck include tilting covers opening downwardly into said lower level.

6. A car according to claim 1, wherein the racks for a row of seats are disposed in a longitudinal direction of the car and are accessible from in front of the seats.

7. A car according to claim 6, wherein the racks for the bottom deck include tilting covers opening downwardly into said lower level.

* * * * *